(12) United States Patent
Britz et al.

(10) Patent No.: US 7,295,777 B1
(45) Date of Patent: *Nov. 13, 2007

(54) OPTICAL/RADIO LOCAL ACCESS NETWORK

(75) Inventors: David M. Britz, Rumson, NJ (US); Jeevan Prakash Dodley, Parsippany, NJ (US); Lih-Yuan Lin, Little Silver, NJ (US); Robert R. Miller, Convent Station, NJ (US)

(73) Assignee: AT&T Corp., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/442,924

(22) Filed: May 30, 2006

Related U.S. Application Data

(63) Continuation of application No. 10/933,134, filed on Sep. 2, 2004, now Pat. No. 7,095,957, which is a continuation of application No. 09/641,083, filed on Aug. 17, 2000, now Pat. No. 6,788,898.

(51) Int. Cl.
*H04J 14/00* (2006.01)
*H04B 10/00* (2006.01)

(52) U.S. Cl. .................. 398/70; 398/115; 398/118; 398/83; 379/56.2

(58) Field of Classification Search .......... 398/70, 398/83, 115, 118, 119–131; 379/56.1–56.3, 379/259

See application file for complete search history.

(56) References Cited

U.S. PATENT DOCUMENTS 6,049,593 A * 4/2000 Acampora ............. 379/56.2

(Continued)

OTHER PUBLICATIONS

A. Acampora, S. Bloom, S. Krishnamurthy, "UniNet: A Hybrid Approach for Universal Broadband Access Using Small Radio Cells Interconnected by Free-Space Optical Links", IEEE Journal on Selected Areas in Communications, vol. 16, No. 6, Aug. 1998.

*Primary Examiner*—Jason Chan
*Assistant Examiner*—Quan-Zhen Wang

(57) ABSTRACT

A communication system includes a plurality of nodes and a plurality of point-to-point links that interconnect the plurality of nodes into a network. Each node includes an optical switch to controllably route a plurality of in-ports of the optical switch into a plurality of out-ports of the optical switch. Each point-to-point link includes a free space optical channel. A first free space optical channel couples to a first node through a receive path and through a transmit path. The receive path couples to a respective in-port of the optical switch of the first node, and the transmit path couples to a respective out-port of the optical switch of the first node. In an alternative embodiment, a communication hub includes a plurality of neighborhood links to corresponding users, an optical switch coupled to the plurality of neighborhood links, and a trunk coupled between the optical switch and a free space optical channel link to the network. A method of communicating in a network having plural links includes sensing the presence of a received signal failure by monitoring channel losses in a first link, the received signal failure resulting from at least one of rain and fog. The method further includes sending data in a free space optical channel of the first link when the received signal failure sensed is due to rain and sending the data in an RF channel of the first link when the received signal failure sensed is due to fog.

4 Claims, 7 Drawing Sheets

U.S. PATENT DOCUMENTS

| | | | |
|---|---|---|---|
| 6,239,888 B1 * | 5/2001 | Willebrand | 398/129 |
| 6,323,980 B1 * | 11/2001 | Bloom | 398/129 |
| 6,788,898 B1 * | 9/2004 | Britz et al. | 398/70 |
| 7,010,227 B1 * | 3/2006 | Britz et al. | 398/55 |
| 7,095,957 B1 * | 8/2006 | Britz et al. | 398/70 |

* cited by examiner

OPTICAL/RADIO LOCAL ACCESS NETWORK

CROSS-REFERENCE TO RELATED APPLICATION

This application is a continuation of U.S. application Ser. No. 10/933,134, filed Sep. 2, 2004 now U.S. Pat. No. 7,095,957 and issued a Notice of Allowance on Apr. 10, 2006, which is a continuation of U.S. application Ser. No. 09/641,083, filed Aug. 17, 2000, now U.S. Pat. No. 6,788,898.

BACKGROUND OF THE INVENTION

1. Field of the Invention

The present invention relates to a local access network that links nodes with a free space optical channel. In particular, the invention relates to a network that brings telephony and data services to the home without a need for wire or fiber to the home.

2. Description of Related Art

Free space optical transmission links are known and can provide broadband service potentially superior to that of radio wireless services. However, the free space optical transmission links are degraded in adverse environment conditions. It has been a challenge to offer continued service when high data rate optical links are unavailable.

SUMMARY OF THE INVENTION

Free space optical channels link together plural distributed switching nodes into a network. A central controller commands these nodes over a known radio telephone system to select alternative network routes to a destination that will bypass adverse environment conditions.

It is an object of the present invention to provide a network with broadband performance even in the presence of adverse link conditions such as rain or fog. It is a further object of the present invention to provide 911 services and critical low speed data services in the presence of adverse link conditions.

These and other objects are achieved in a communication system that includes a plurality of nodes and a plurality of point-to-point links that interconnect the plurality of nodes into a network. Each node includes an optical switch to controllably route a plurality of in-ports of the optical switch into a plurality of out-ports of the optical switch. Each point-to-point link includes a free space optical channel. A first free space optical channel couples to a first node through a receive path and couples to a second node through a transmit path. The receive path couples to a respective out-port of the optical switch of the first node, and the transmit path couples to a respective in-port of the optical switch of the second node.

These and other objects are achieved in an alternative embodiment of a communication hub that includes a plurality of neighborhood links to corresponding users, an optical switch coupled to the plurality of neighborhood links, and a trunk coupled between the optical switch and a free space optical channel link to the network.

These and other objects are achieved in a method of communicating in a network having plural links that includes sensing the presence of a received signal failure by monitoring channel losses in a first link, the received signal failure resulting from at least one of rain and fog. The method further includes sending data in a free space optical channel of the first link when the received signal failure is sensed due to rain and sending the data in an RF channel of the first link when the received signal failure is sensed due to fog.

BRIEF DESCRIPTION OF DRAWINGS

The invention will be described in detail in the following description of preferred embodiments with reference to the following figures wherein.

DETAILED DESCRIPTION OF PREFERRED EMBODIMENTS

Figure 1:
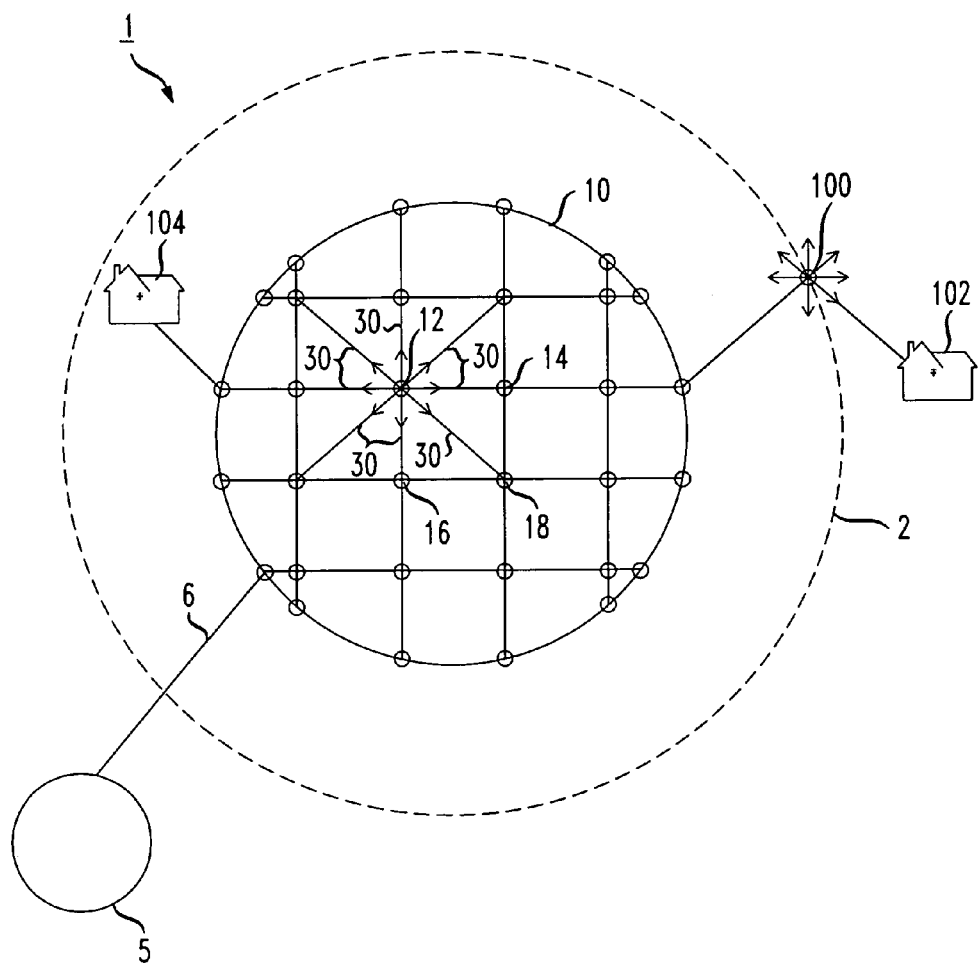
FIG. 1 is a schematic diagram of a broadband local access communication system according to the invention.
Figure 2:
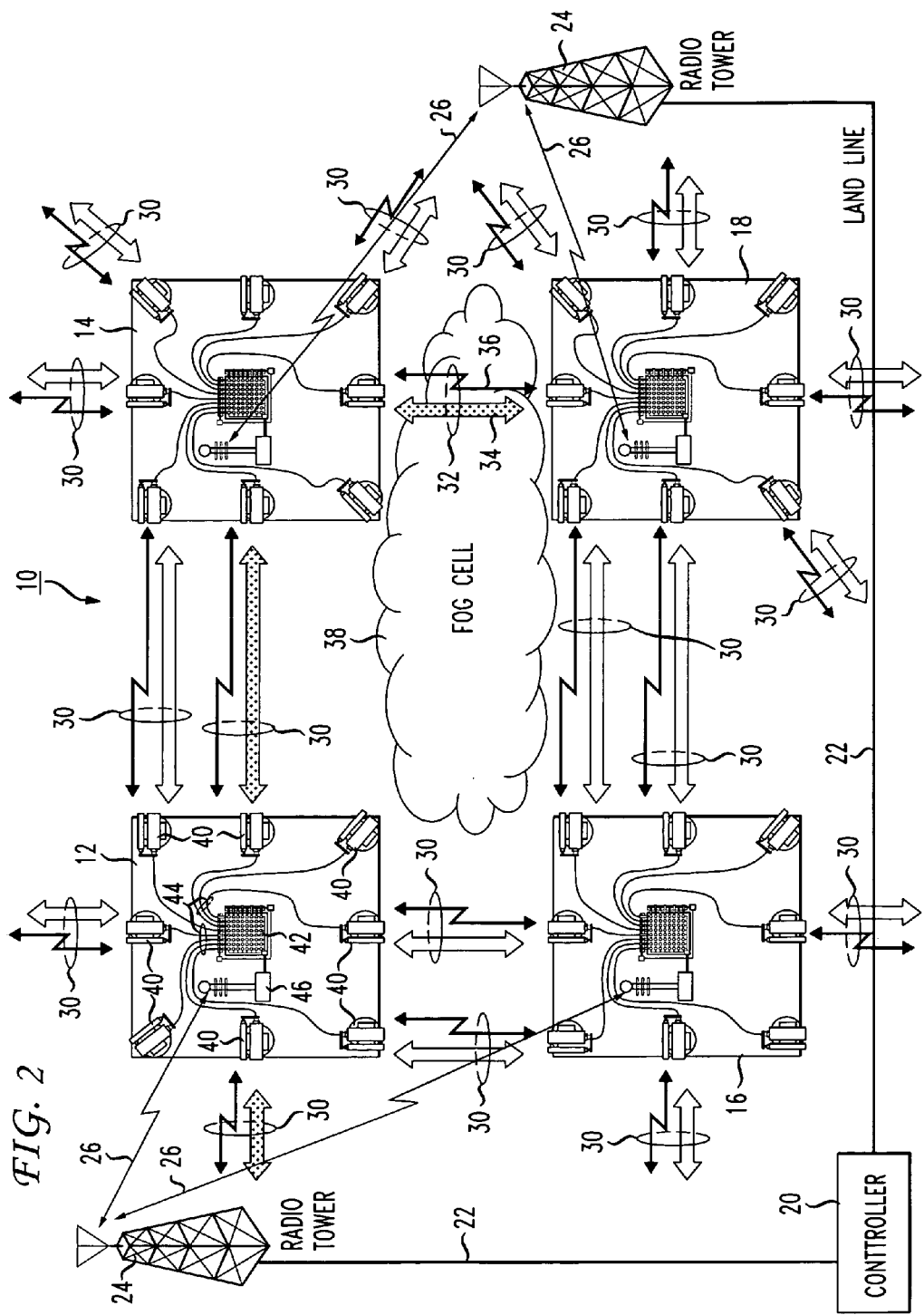
FIG. 2 is a schematic diagram of a metro communication network of the system of FIG. 1 according to the present invention.

In FIG. 1, access communication system 1 includes metro grid communication system 10 as a first-level system, direct customer specific point-to-point links to customer sites 104 as a second-level system, and pole-to-home links to customers' homes from a neighborhood pole 100 as a third-level system. Communication system 1 serves metropolitan areas characterized by tall buildings to support nodes of the system in metro grid 10, and it extends to the limits of neighborhoods 2 or suburbs of the metropolitan area. Each link of metro grid 10 preferably supports an optical signal or channel 3 (as shown in FIG. 2) and an RF signal or channel 36 (as shown in FIG. 2) that may be selectively enabled depending on weather conditions.

Within neighborhood 2, towers and/or poles 100 often serve to support nodes in the local neighborhoods. Services for the neighborhoods are wavelength multiplexed together (for optical signals) and/or frequency multiplexed together (for RF signals) and linked between neighborhood pole 100 and metro grid 110.

Some sites, for example a business in either the metro area or the neighborhoods, may require a dedicated high-speed link. To serve this need, a customer-specific point-to-point link is established to customer site 104. Such a point-to-point link typically carries a single wavelength optical signal and/or a single frequency RF signal.

Area communication system 1 is advantageously linked to other communications systems. For example, another communication system 5 might be linked via fiber link 6 to area communication system 1, and communication system 5 might be, for example, a SONET ring system.

In FIG. 2, communication system 10 includes a plurality of nodes, depicted as nodes 12, 14, 16 and 18, that are typically located on the top of buildings, at windows in buildings or on the outside walls of buildings in metropolitan areas and on towers elsewhere. Each node is coupled to a network control system that includes central controller 20, land lines 22 and one or more radio towers 24. Radio towers 24 communicate with the nodes over wireless links 26. The control system may advantageously include a typical cellular telephone system, controller 20 (located at a convenient location) and cell phone transceiver 46 at each node to direct the operation of communication system 10.

The nodes are configured into a network by a plurality of point-to-point links 30 of which link 32 is typical. Each link, as depicted by link 32, includes a bi-directional (e.g., duplex) free space optical channel 34. However, in any single link, there may be only a unidirectional channel. Furthermore, in an alternative embodiment of the invention as discussed below, one or more links, as depicted by link 32, further includes radio frequency (RF) channels 36. RF channel 36 and free space optical channel 34 complement each other. The RF channel propagates better than the optical channel through fog and the optical channel propagates better than a millimeter wave RF channel through rain.

Each node includes at least one outdoor unit 40 (hereinafter ODU), and typically a plurality of ODUs. For example, eight ODUs 40 are depicted in FIG. 2 on the top of a building at node 12. Each ODU is coupled to switch circuit 42 through respective cables 44. Each ODU couples free space optical signals received over link 30 into cable 44, and propagates optical signals in a fiber in cable 44 as free space optical signals over link 30. In some embodiments of the invention, each ODU also couples data from an RF path received over link 30 into cable 44 and propagates data over an RF path from cable 44 over link 30. Typically, cable 44 includes two fibers to carry inbound and outbound optical signals and, if the respective link includes an RF channel, the ODU includes inbound and outbound RF cables (e.g., coax cables). Switch circuit 42 is controlled by controller 30 through cell phone transceiver 46.

The free space optical channel (hereinafter FSOC) can transmit super high bandwidths that no other wireless technology can offer. However, the FSOC availability is degraded when fog sets in. A best way to harness the bandwidth offered by the FSOC technology is to use it in an "as available basis" and to have radio channels for backup and redundancy when the optical channel is unavailable. The drawback with a radio channel as a backup or for redundancy is that a radio channel cannot support the bandwidth that can be carried over an FSOC. However, a radio channel can continue to offer services at a lower data rate.

FIG. 2 shows four nodes in a network connected to each other. Fog cell 38 is shown in this figure to show that an FSOC can go out of service. The radio frequency chosen for the backup link should have complementary characteristics or should be fade-free for the link under consideration. For example, the optical channel and the radio channel should not fade at the same time. The spectrum chosen for the radio link is either a 38 GHz radio or an ISM band spectrum (i.e., industrial, scientific and medical band including 5 GHz, 2.4 GHz, 960 MHz, 400 MHz and 200 MHz bands). The 38 GHz radio (mm-wave) fades under rainy conditions and does not fade when there is fog. This is because the wavelength of the mm-wave is of the order of the size of raindrops. The converse applies to the optical beams, where the optical wavelength is of the order of the size of the wafer fog droplet. As a result, in fog the optical beam scatters, resulting in heavy attenuation to the optical beam. To transmit at mm-wave band, one needs to own a license for the frequency spectrum. An advantage of this is that no interference or jamming by other mm-wave users should occur.

With the growth in RF IC designs, there are radios available in the license-free ISM band. A 5 GHz radio in the UNII band is a good candidate for the redundant path since this offers good transmission characteristics, line of sight link and uses 802.11 as a standard. In addition to this backup radio link, cellular phone transceiver 46 is shown at each node. This may be a standard mobile cell radio connected to the FSOC controller 20 located at a network operation center or elsewhere. Controller 20 communications with all the cellular radios to send commands and receive status information from all the nodes.

Figure 3:
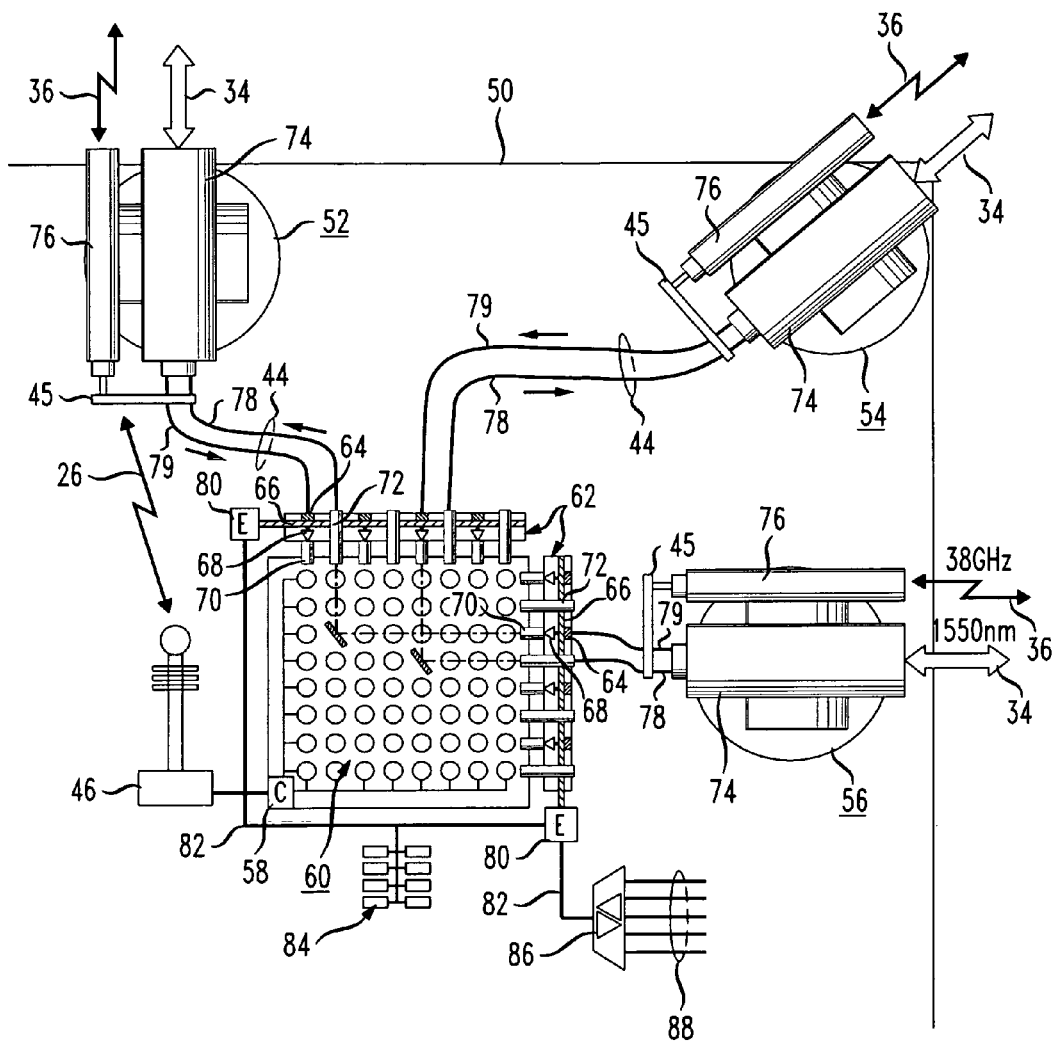
FIG. 3 is a schematic diagram of a portion of a node of the metro communication network according to the present invention.

In FIG. 3, a portion of node 50 includes ODUs 52, 54 and 56, cell phone transceiver 46, switch 60, optical-to-electrical-to-optical interfaces 62, and cables 44. Each ODU includes a telescope 74, an RF unit 76 and an input/output interface 45. Interface 45 enables the ODU to send outbound signal traffic from outbound fiber 78 selectably to either telescope 74 or RF unit 76. Interface 45 also enables the ODU to receive inbound signal traffic on inbound fiber 79 selectably from either telescope 74 or RF unit 76. The routing of interface 45 is controlled by signals from transceiver 46.

Telescope 74 of ODU 56 focuses an inbound optical signal from free space optical channel 34 into a multi-mode fiber, and the inbound signal is routed through interface 45 to inbound single-mode fiber 79. Optical-to-electrical-to-optical interfaces 62 include plurality optical detectors 64 (e.g., photo diode, avalanche photodiode, photo transistor, etc.) to convert optical signals from, for example, inbound single mode fiber 79 into electrical signals on electrical bus 66. Optical-to-electrical-to-optical interface 62 also includes driver-amplifier and laser source 68 to provide an optical signal that is coupled through input single-mode fiber 70 into switch 60. Local controller 58 under commands from cellular phone transceiver 46 controls switch 60 to reflect the optical signal into output single-mode fiber 72. The optical signal passes through output single-mode fiber 72, through single-mode fiber 78 through interface 45 into telescope 74 of ODU 52 to transmit an outbound optical signal through the proper free space optical channel 34.

Add and/or drop multiplexers 84 from the building in which node 50 is located are coupled through electrical bus 82 and bus controller 80 into or from bus 66. Add and/or drop fiber optic lines 88 from the building in which node 50 is located are coupled through converter 86 (e.g., having a fused biconic taper and detector on the optical receive side and a laser on the transmit side) through electrical bus 82 and bus controller 80 into or from bus 66.

In the event that fog blocks the optical channel of the link served by ODU 52, transceiver 46 communicates with controller 20 which in turn sends commands via radio link 26 or equivalent land line links to local controller 58. Local controller 58 commands interface 45 so that optically converted inbound radio signal 36 is coupled from RF unit 76, through interface 45 into inbound fiber 79 of cable 44 in the place of the optical signal from telescope 74. In a variant, some or all of the ODUs include gimbles (one or two axes) and servo controllers commanded by cell phone transceiver 46 to repoint the telescope and RF unit.

FIG. 3 is an exploded view of a node, and it shows three FSOC link telescopes on which are mounted mm-wave or ISM band radio. Also shown in this figure is a cellular radio output connected to local controller 58 which, in turn, controls a MEMs (or other optical) switch. The MEMs switch provides the redirection (routing) of the optical beams, which is controlled by a local controller. The inputs to the local controller are from the cellular radio terminal, or the redundant radio link. There are three links at each node: first is an optical link for high-speed data transmission; second is a radio link for redundant lower speed data; and third is a cellular radio link for command and control. The command and control information on the cellular radio is preferably fed to the radio link to provide redundancy to the control data at nodes in cases when cellular link is not available. Additional redundancy is obtained by sending the data on the radio to the optical link either by FDM (frequency), TDM (time) or WDM (wavelength) on the optical wavelength.

Figure 4:
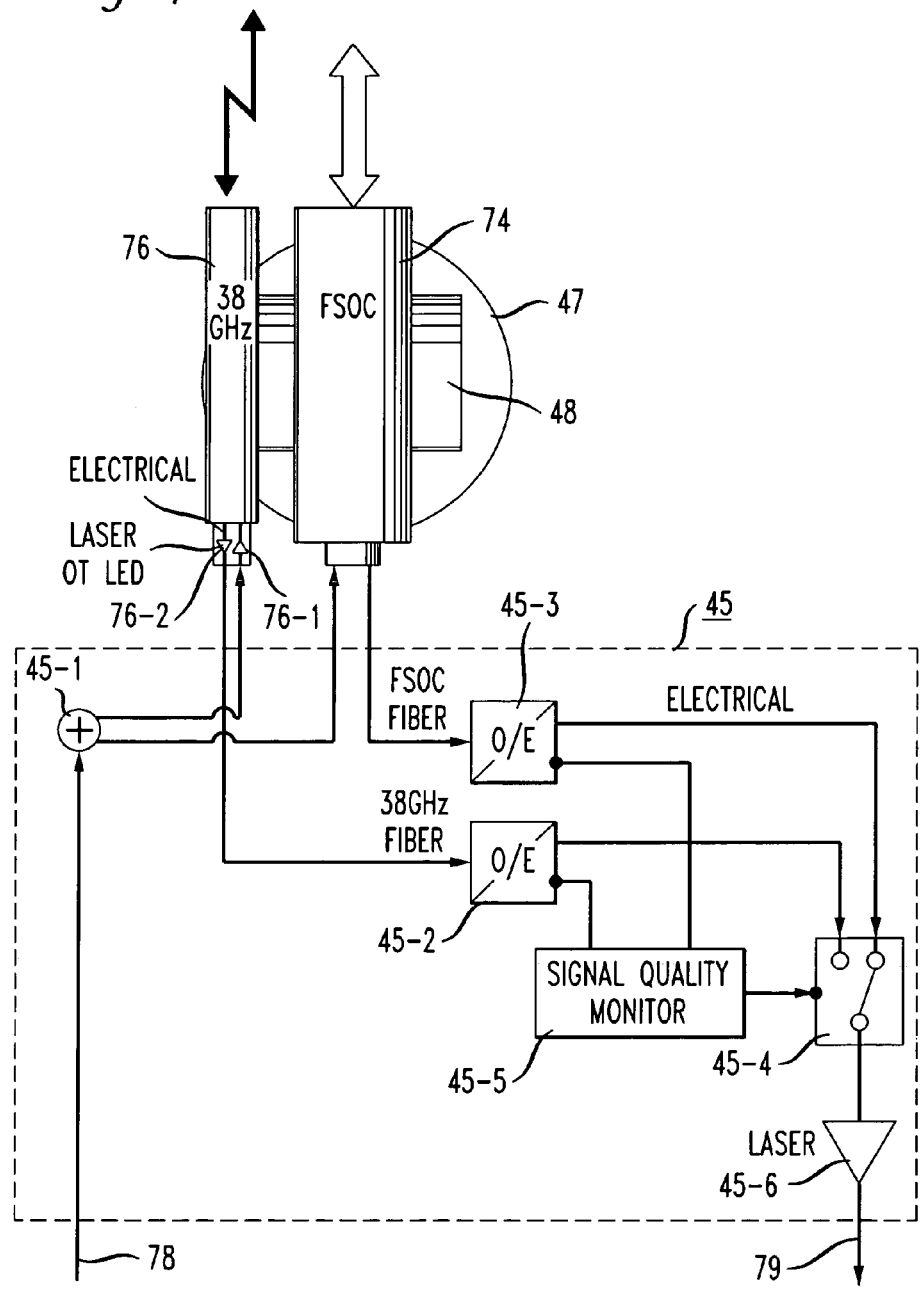
FIG. 4 is a schematic of an outdoor unit (ODU) according to the present invention.

The only elements of the link that need be on the roof, at a window or on a side of a building are the outdoor units (ODUs). In FIG. 4, an outdoor unit includes telescope 74, rotation gimbal 47, nod gimbal 48, servo controller (not shown), the radio unit 76 and input/output interface 45. The ODU interfaces with two optical connectors 78, 79 that form cable 44 (see FIG. 3). The optical transmit signal is connected to the ODU by single-mode fiber 78 coming from the laser transmitter which is located in an indoor unit (IDU). The optical receive signal from interface 45 is connected to the IDU by single-mode fiber 79. Interface 45 includes fiber optical splitter 45-1 to split the signal from fiber 78 into two optical signals carried on respective fibers to RF detector 76-1 and telescope 74, respectively.

RF unit 76 includes optical detector 76-1 (e.g., a photodiode) and laser source 76-2 (e.g., a laser diode or an LED). Optical detector 76-1 converts an optical signal received from splitter 45-1 into an electrical signal to modulate the RF unit. Laser source 76-2 modulates an electrical signal received by RF unit 76 into an optical signal for transmission over a fiber to optical detector 45-2. Interface 45 further includes optical to electrical converters 45-2 and 45-3 (also called detectors, e.g., photodiodes). Optical detector 45-2 receives the optical signal from laser source 76-2 (or RF unit 76) and optical detector 45-3 receives the optical signal from telescope 74. Telescope 74 concentrates the received signal into a multi-mode fiber that is coupled to optical detector 45-3. The electrical outputs from detectors 45-2 and 45-3 are provided to single-pole double-throw electrical switch 45-4. Detectors 45-2 and 45-3 are also coupled to signal quality monitor 45-5 that is in turn coupled to control electrical switch 45-4. Monitor 45-5 determines through which channel (optical or RF) the strongest signal is received, and then commands switch 45-4 to provide the strongest signal to laser source 45-6. Laser source 45-6 converts the electrical signal into an optical signal on single-mode fiber 79. In the IDU, as shown by FIG. 3, the optical receive signal from fiber 79 is converted to an electrical signal on electrical bus 66 by optical detector 64 (e.g., photodiode) and then re-modulated as an optical signal by laser source 68 (e.g., laser diode) and propagated over a single-mode fiber into MEMS switch 60. Interface 45 is controlled by transceiver 46 to select either RF or optical duplex operation.

As shown in FIG. 3, co-located to the IDU is an electrical add-drop multiplexer (ADM) 84 and connection to a passive optical node (PON) network 88. The optical beam received from a distant link is available at the output of the ODU, which is connected to the IDU by a multi-mode fiber. This allows all the active optical elements to be inside the building in a controlled environment for reliability and flexibility to operate.

Optical links are made out of the ODU and IDU. The IDU has the laser transmitters and optical receivers. The power output and wavelength is selected by the IDU. The output from the laser is fed to the MEMs optical switch for routing. The routed output of the MEMs switch is connected to the telescope in the ODU by a single-mode fiber. The optical receiver at the IDU is connected by a multi-mode fiber from the ODU. The optical receiver converts the optical signal into electrical. This allows the optical beam received through the free space to be converted to electrical by direct detection.

Figure 5:
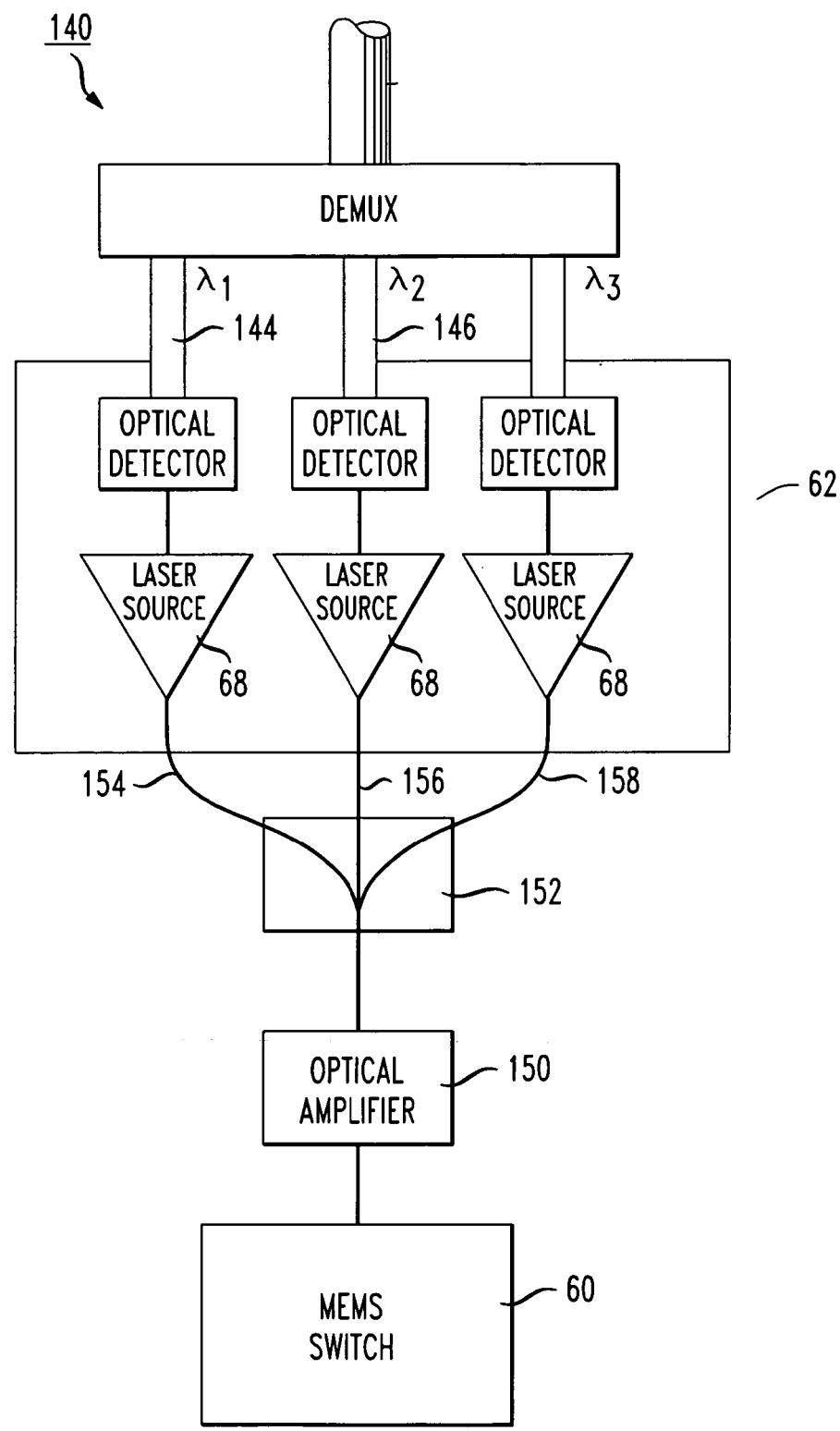
FIG. 5 is an alternative configuration to process an inbound optical WDM signal on a multi-mode fiber into an optical WDM signal on a single-mode fiber according to the present invention.

In FIG. 5, a variant circuit 140 as an alternative configuration includes a multi-mode wavelength demultiplexer 142 coupled between inbound multi-mode fiber 79 and optical-to-electrical-to-optical interface 62. Demultiplexer 142 separates the inbound WDM signal on single-mode fiber 79 into plural signals dependent on wavelength. In the figure, the inbound signal is separated by demultiplexer 142 into three optical signals, defined by wavelengths $\lambda_1, \lambda_2, \lambda_3$, and the three single wavelength optical signals are provided on output multi-mode fibers 144, 146 and 148. The three single wavelength optical signals are processed through optical-to-electrical-to-optical interface 62 and, from there, are provided on respective single-mode fibers 154, 156 and 158.

Optical-to-electrical-to-optical interface 62 processes signals as discussed with respect to FIG. 3. Optical detector 64 converts an optical signal on inbound multi-mode fiber (e.g., 144) into an electrical signal on electrical bus 66, and laser source 68 (e.g., a laser diode) converts the electrical signal on electrical bus 66 into an optical signal on a single-mode fiber (e.g., 154). A function of optical-to-electrical-optical interface 62 is to convert an optical signal carried in a multi-mode fiber into an optical signal carried on a single-mode fiber. A difference between single-mode and multi-mode fibers is the fiber diameter. For wavelengths in the 1550 nanometer band, a fiber having a diameter of from 9 to 12 microns will only support a single mode. However, if the diameter were larger (e.g., 60 microns or more), multiple modes could propagate within the fiber. An optical signal received by a telescope can be focused into a multi-mode fiber to achieve low coupling loss. Optical-to-electrical-to-optical interface 62 detects the optical signal from a multi-mode fiber (e.g., 144, 146 or 148) and reconstitutes the optical signal in a single-mode fiber (e.g., 154, 156 or 158) at respective wavelengths $\lambda_1, \lambda_2, \lambda_3$.

In FIG. 5, biconic taper fiber 152 (or similar functioning device) combines signals that are carried in single-mode fiber 154, 156 and 158 and provides the combined WDM signal to optional optical amplifier 150. Amplifier 150 is preferably an erbium doped fiber amplifier (EDFA) but may be of other design. Amplified 150 provides the amplified signal level that is provided to MEMS switch 60 (see FIG. 3).

Radio links of the system use LAN (10base-t or 100base-t) interface cards. The data field in the LAN has the address and status information of all the nodes in the network. This would allow any node in the network to know the status of any other node. By providing a dedicated data field in the LAN, it is possible to offer 911 services and a few voice calls. The rest of the data field is used for information transfer. When more than one branch fails, the "information data field" is shared by the failed branches as in the case of a LAN.

The purpose of the cellular link is to provide an interface to the remote controller to monitor and control the nodes. There is a cellular radio installed at each node that works with the local cellular radio provider. When the optical received signal strength falls below a certain level, it generates an alarm that the cellular radio transmits to the controller. The controller uses this information to send the required commands to the nodes for reconfiguration. The cellular radio has a data interface card to transmit locally generated alarms and status conditions and to receive commands from the remote controller.

The ADM and distribution cards are located at the IDU. The electrical signals generated by the optical receiver are used locally for distribution or generated if required and sent to a laser for routing through the links, or to a PON for distribution. The E bus shown in FIG. 3 has all the electrical signals obtained from the optical receivers.

In a second embodiment, this architecture has only two layers, optical and cellular without the radio layer. This would allow for cost reduction and spectrum unavailability for the radio link. In this architecture, the optical link provides the data throughput, and the cellular radio provides the monitoring, management of the network node and a 911 call capability.

As discussed with respect to FIG. 1, a customer specific point-to-point link to customer site 104, for example a business, is typical of a site that may require a dedicated high speed link in either the metro area or the neighborhoods. To serve this need, a point-to-point link is established that typically carries a single wavelength optical signal and/or a single frequency RF signal (e.g., a 38 GHz radio). The optical and RF channels each serve as a back up link for the other based on weather where multiple broadband radio links are required at the subject node location. Cellular or other low data rate wireless links are used for monitoring, command and control.

Figure 6:
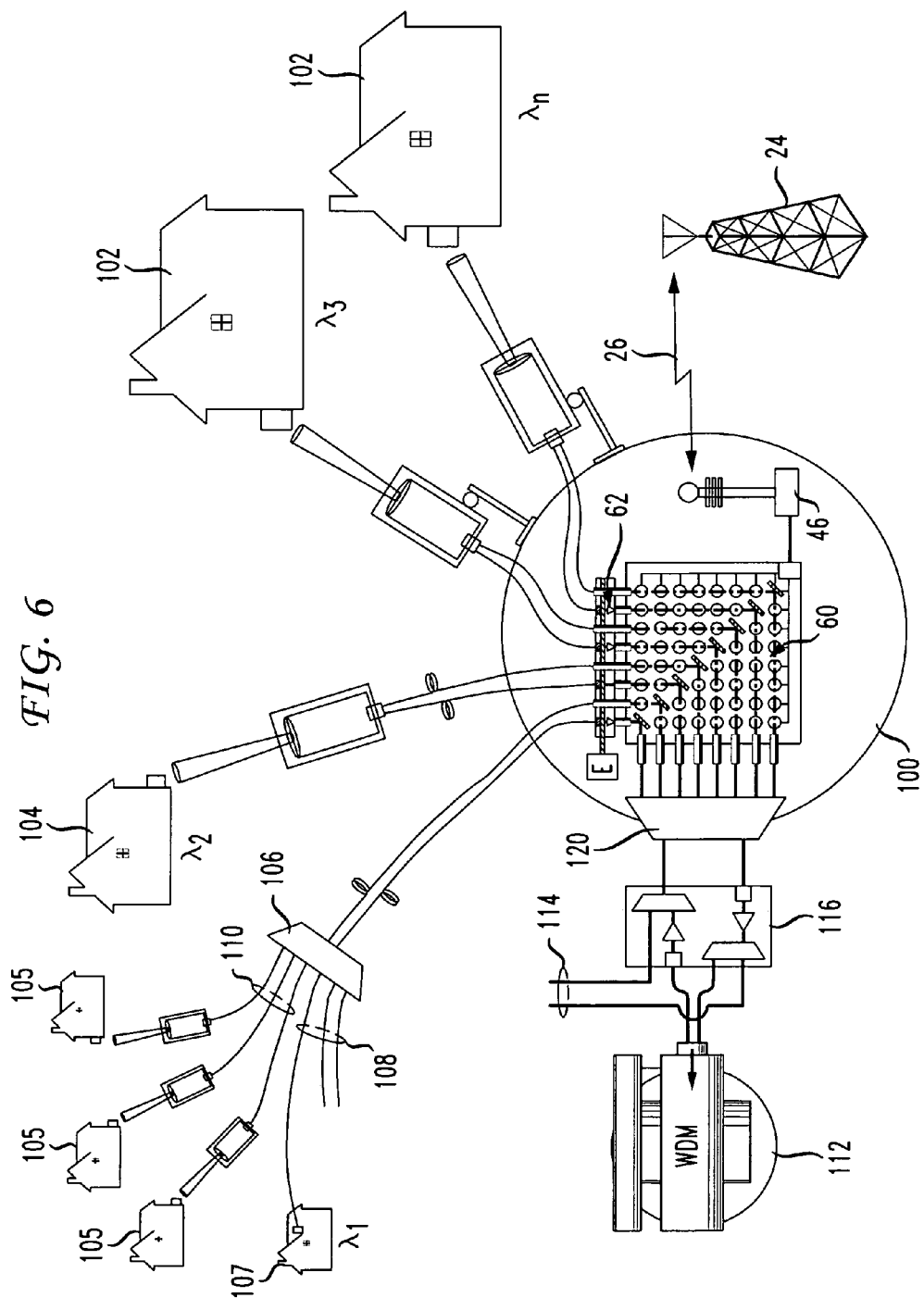
FIG. 6 is a schematic diagram of local communication hub according to the present invention.

In FIG. 6, local hub 100 is mounted on a neighborhood pole or suitable tall structure in the neighborhood to be served with "to the home" service. Local hub 100 includes optical-to-electrical-to-optical interface 62, electro-optical switch 60, and cellular phone transceiver 46. The cellular phone transceiver controls the local hub by relaying commands received from radio tower 24 over wireless link 26 and reporting status to radio tower 24 over wireless link 26. Control of local hub 100 by way of the radio link is the same as control of the network depicted in FIG. 2.

Figure 7:
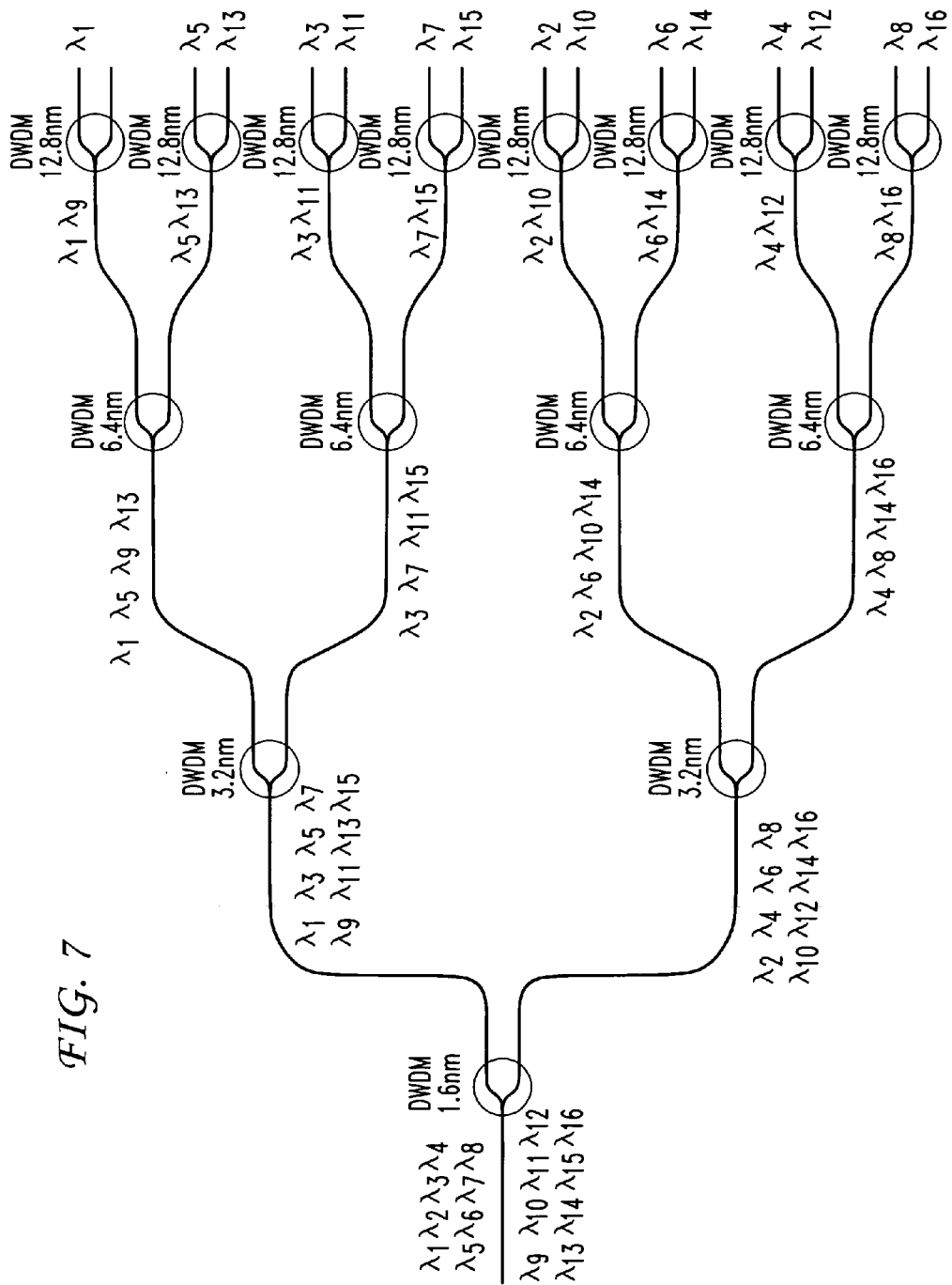
FIG. 7 is a schematic diagram of a demultiplexer for wavelength division multiplex signals as used in the present invention.

Local hub 100 includes a WDM or DWDM fiber coupler 120. Coupler 120 is a tree configuration providing for the multiplex and/or demultiplex of multiple wavelength optical signals in a fiber. FIG. 7 shows a 1×16 fiber-based coupler 120 where a single fiber carrying 16 wavelengths ($\lambda_1$ through $\lambda_{16}$) is demultiplexed into 16 individual fibers, each carrying a corresponding wavelength.

Local hub 100 further includes 1×2 electro-optical switch 116. Hub 100 is connected through 1×2 electro-optical switch 116 to the network depicted in FIG. 2 over fiber links 114 or over free space optical channel (FSOC) link 112. A wavelength division multiplexed (WDM) optical signal received from a network is demultiplexed in coupler 120 and routed appropriately through switch 60 and interface 62. A demultiplexed optical signal of the appropriate wavelength may be routed to homes 102 over a distance of several hundreds of meters using FSOC telescopes mounted on the pole, tower or building on which the hub is mounted. When home 104 is too far from hub 100, a length of optical fiber may be used to carry the signal to an FSOC telescope located closer to the home. When plural homes 105 are too far from hub 100, a length of optical fiber is used to carry optical signals to an all-fiber-based optical coupler 106, suitably located to broadcast via FSOC telescopes to homes 105. Similarly, all-fiber-based optical coupler 106 separates other wavelengths and can deliver data on fiber cables 108 directly to one or more homes 107 without going through FSOC telescopes. In exactly the reverse direction, optical signals from homes 102, 104, 105 and 107 are transported to interface 62 and switch 60 and then to coupler 120. Coupler 120 is coupled through switch 116 either to FSOC link 112 to the network of FIG. 2 or to optical fiber cables 114 to the network of FIG. 2.

Routing of the data network through the FSOC link is shown in FIG. 6. In this embodiment the optical and radio architecture is used for low cost wide distribution local access "pole to home". In this arrangement, a micro local hub is located at the base of a suitable structure (pole, tower or building), or similarly to the above embodiments, roof mounted. The local hub is designed to receive fiber fed optical signals that may be from a FSOC link or from fiber routed to the neighborhood. Optical signals entering the optical-to-electrical-to-optical transceiver interface will be in a single-mode format where possible, but in the case of the FSOC receiver interface, will be a multi-mode format until such time as a low loss multi-mode to single-mode conversion can be achieved.

The fiber and/or FSOC interface is routed through a 1×2 optical/electrical switch. Note that the multi-mode signal from the FSOC device is first electrically detected and converted back into a single-mode optical signal prior to going through the optical switch.

The optical signals are then fed to all-fiber-based couplers with a tree structure providing the multiplex of multiple wavelengths in a 1×2 1×6 or 1×N configuration (providing customer wavelength selected allocation see FIG. 7). Such devices allow customer data to be loaded onto a single wavelength. Standard wavelength non-specific all-fiber technology can be used in this application, but at the cost of significantly lowering the optical signal to noise ratio and a requirement that detectors at the customer end must receive and process all the transmitted wavelengths.

The wavelength selected individual fiber outputs are then directed to the network side of a MEMs-based or other optical switch, each with a 1×16 to 1×N selectable output. The presence of the switch is similar to the above-described MEMs switch embodiment in that it provides an overlaying RF cellular-based switch selection architecture for routing and restoration of customer channels; it also provides an added capability of service activation/deactivation via remote (cellular control of the switches' microoptical mirrors).

The single-mode specific wavelength optical signal output to the customer is fiber-fed to a dedicated ground-level local "fiber to the home" or a low cost FSOC device mounted on a suitable structure for short 100-200 meter transmissions to the customer premise. A number of optical, radio, fiber and cable "deployments to the home" scenarios are possible with this MEMs-based optical/RF hub application.

The return path is a single-mode signal for fiber-dedicated arrangements; but a multi-mode signal received from the FSOC bulk optics focal plane is electrically detected and converted back to a single-mode optical signal via a low cost single wavelength laser transmitter and launched back into the MEMs switch for return path routing. A more flexible embodiment would use wavelength selectable lasers for the return path located at the hub's customer-side optical-to-electrical-to-optical interface where by selection of suitable single-mode wavelengths that can be multiplexed back into the network fiber.

The MEMs switch channels the return path optical signal to a suitable receiver port on the network all-fiber couplers side of the MEMs switch. The all-fiber couplers multiplex the multiple single-mode wavelength return path signals, regenerate them if necessary, or launch them back into the neighborhood's return path fiber or roof-top FSOC device.

Having described preferred embodiments of a novel local access network (which are intended to be illustrative and not limiting), it is noted that modifications and variations can be made by persons skilled in the art in light of the above teachings. It is therefore to be understood that changes may be made in the particular embodiments as defined by the appended claims.

Having thus described the invention with the details and particularity required by the patent laws, what is claimed and desired protected by Letters Patent is set forth in the appended claims.

What is claimed is:

1. A communication system comprising:
   a plurality of nodes, each node including an optical switch to controllably route signals from a plurality of in-ports of the optical switch into a plurality of out-ports of the optical switch;
   a plurality of point-to-point links that interconnect the plurality of nodes into a network, each point-to-point link including a free space optical channel for likewise interconnecting the plurality of nodes, a first free space optical channel coupling to a first node through a receive path and to a second node through a transmit path, the receive path coupling to a respective out-port of the optical switch of the first node, the transmit path coupling to a respective in-port of the optical switch of the second node, further comprising a wireless network control system coupled to each node of the plurality nodes; and
   a communication hub coupled to the network, the communication hub comprising
      a plurality of neighborhood links associated with corresponding users in a one-to-one relationship;
      an optical switch coupled to the plurality of neighborhood links;
      a trunk coupled to the optical switch; and
      a wireless network-controlled switch responsive to the wireless network control system to selectably couple the trunk between a free space optical channel link to the communication network and an optical fiber link to the communication network.

2. The communication system as defined in claim 1 wherein the communication hub trunk comprises
   a wavelength division multiplexer coupled between the wireless network-controlled switch and the optical switch.

3. The communication system as defined in claim 1 wherein at least one neighborhood link of the plurality of communication hub neighborhood links comprises a free space optical channel telescope for communicating free space optical signals between the optical switch and the corresponding user.

4. The communication system as defined in claim 1 wherein at least one neighborhood link of the plurality of communication hub neighborhood links comprises
   a length of optical fiber coupled at a first end to the output of the optical switch; and
   a free space optical telescope coupled to a second, opposing end of the length of optical fiber for communication signals between the optical fiber at a corresponding user.

* * * * *